A. Stoker.

Tailors' Measure.

No. 95. A.I. Patented Sept. 3. 1850

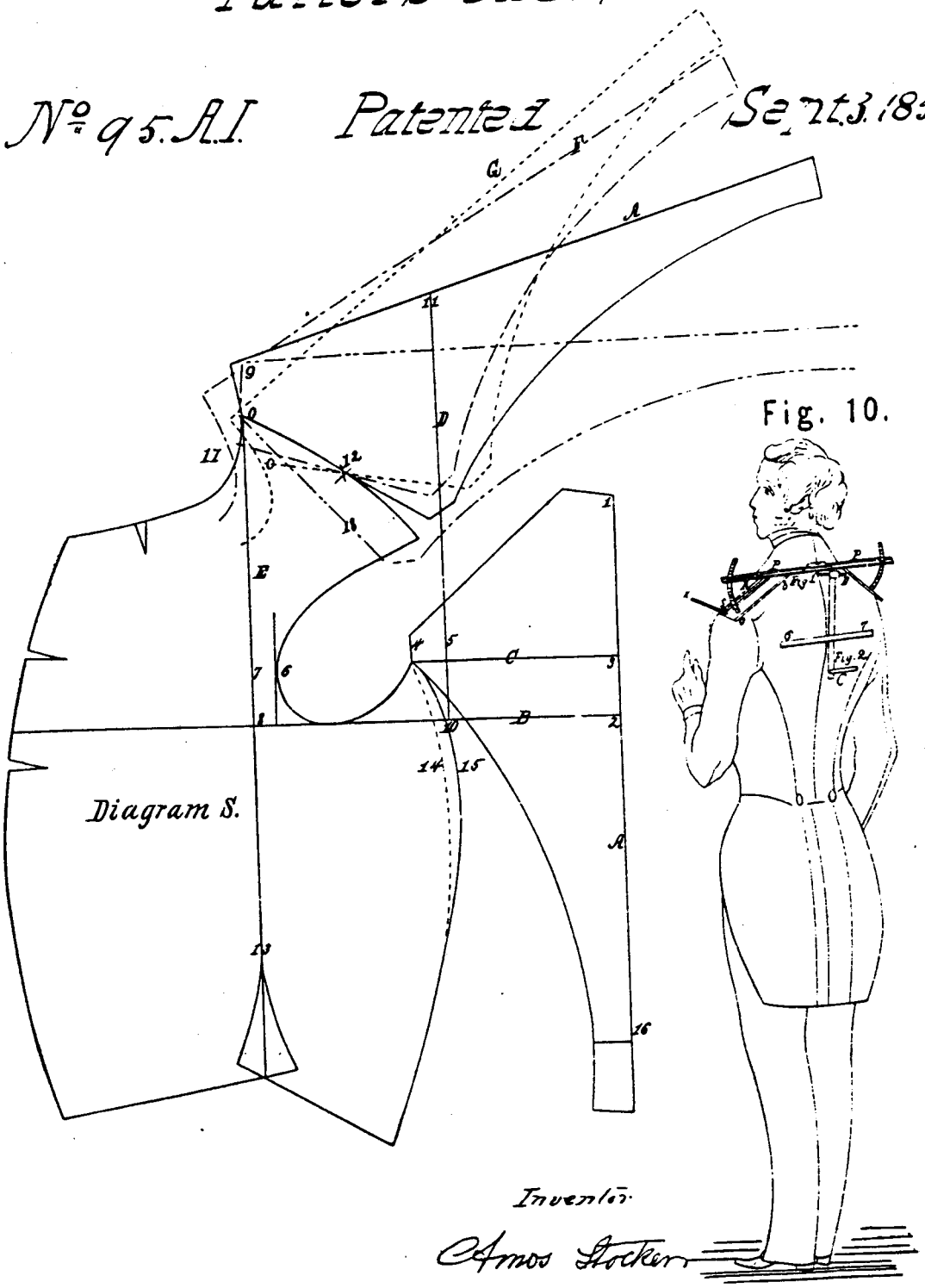

No. 95.—*Improvement in Tailors' Measures.*

What I claim in these letters patent, additional, is the combinatiom of the socket and rule, figs. 6, 7, with the instrument represented, at fig. 2, also the socket in the arms 6, 7, as represented, also the manner of connecting two instruments together, by bar P, P, as represented on fig. 10, for the purpose of ascertaining the slope of both shoulders at one operation, also the additional width of the lower arm, and the combination of the groove and slide R, S, and rule X, with the lower arm as represented at 0, 8, as set forth.

AMOS STOCKER.

DEPARTMENT OF COMMERCE
UNITED STATES PATENT AND TRADEMARK OFFICE

---

MISSING PAGE(S)

PATENT NUMBER AI 95 FOR THE ISSUE DATE 09/03/1850 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text